2,422,628

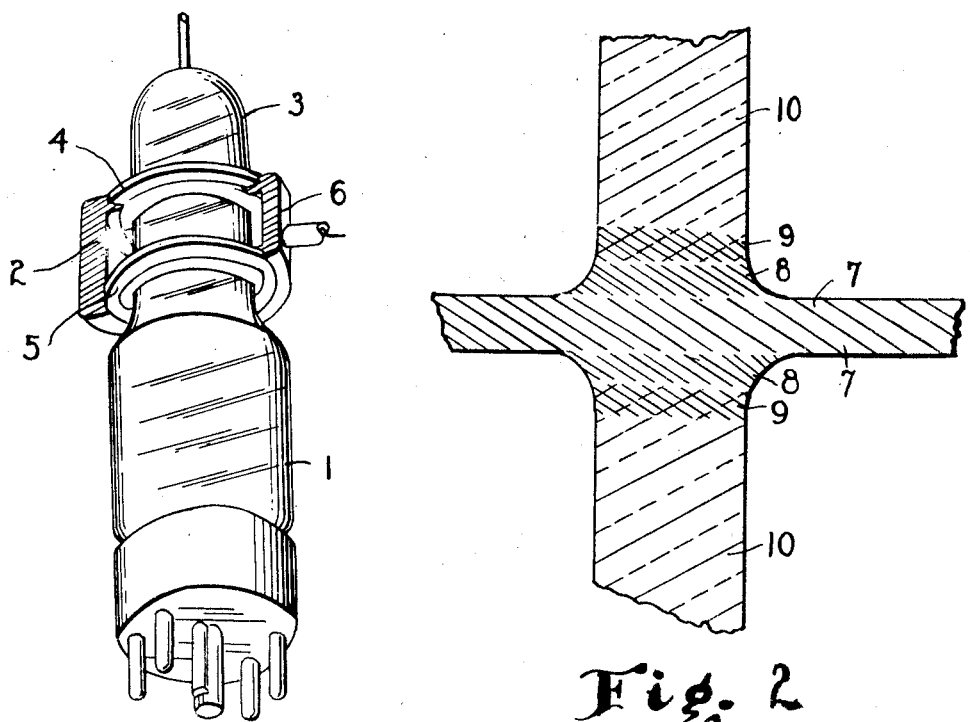
Fig. 1
Fig. 2
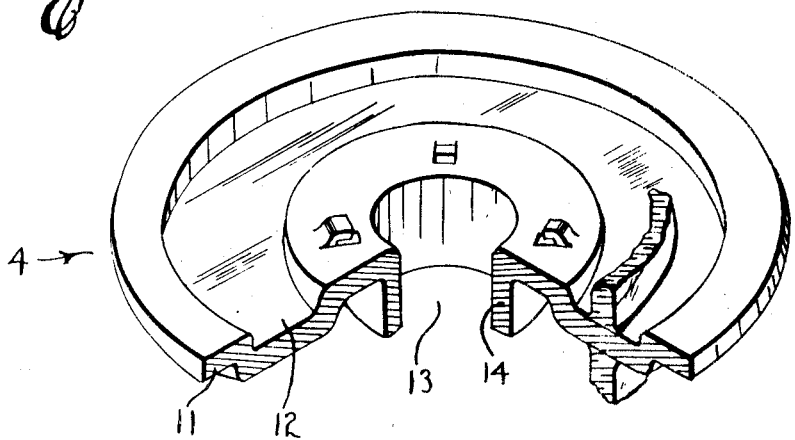
Fig. 3
Henry J. McCarthy INVENTOR.
BY [signature]
ATTORNEY Patented June 17, 1947

UNITED STATES PATENT OFFICE 2,422,628

GLASS TO METAL SEAL

Henry J. McCarthy, Danvers, Mass., assignor to Sylvania Electric Products Inc., Salem, Mass., a corporation of Massachusetts Application June 12, 1943, Serial No. 490,702

2 Claims. (Cl. 117—53)

This invention relates to glass to metal seals and has particular reference to preparation of the metal prior to the sealing operation.

An object of this invention is to provide an improved glass to metal seal.

Another object is to provide an improved method of preparing the metal in a glass to metal seal prior to sealing operation.

Another object is to provide an improved metal unit as the metal portion of a glass to metal seal.

Other objects, advantages, and features will be apparent from the following specification taken in conjunction with the accompanying drawing in which:

Figure 1 is a perspective view of a tube embodying glass to metal seals;

Figure 2 is a sectional view of a portion of the tube of Figure 1, in illustration of a glass to metal seal; and Figure 3 is a perspective enlargement of one of the metal parts of the tube of Figure 1.

A method of preparing a metal for sealing to glass includes the steps of oxidizing the metal and covering the oxide with borax. The oxide forms a surface to which glass will join, and the borax provides the flux in the heat treatment of the sealing operation.

It has been found to be desirable to first coat the metal with borax, and thereafter to heat the metal to oxidization.

A disadvantage in this method is that the borax is often put on in excess or in improper arrangement so that when heated for the purpose of oxidizing the metal, the borax glasses over before the metal is oxidized, thus shutting out the air from the metal and preventing proper oxidation of the metal. Without proper oxidation, that is, uniform, complete, and relatively shallow or thin, a suitable glass to metal seal can not be obtained.

This disadvantage is obviated by this invention which includes the method step of applying the borax to the metal to form a dry, porous layer which permits air to reach the metal during the oxidation heating and makes possible oxidation of the metal before the borax glazes over.

The excellent glass to metal seal which is made possible by this invention is particularly useful in electronic tubes, for example, the type using copper discs to separate glass sections in a tube envelope wall as shown in the drawings. This type of tube uses the copper discs and an outside connection housing as a high frequency oscillatory circuit. It is vital, in tubes of this nature, that the glass to metal seals be complete and efficient.

As shown in the drawings, the illustrative embodiment of this invention resides in the tube of Figure 1, having glass envelope sections 1, 2, and 3, and copper separator discs 4 and 5. In the operation of the tube, the discs 4 and 5 are connected, outside of the tube, by connection housing 6, to form an oscillatory circuit.

In the method of this invention, the discs 4 and 5 are processed prior to and in readiness for, sealing to the glass sections 1, 2, and 3. This seal is illustrated in Figure 2 and shows the metal as at 7, the layer of joining between the metal and the oxide as at 8 and composed of metal and oxide, the layer of joining between the oxide and the glass as at 9 and composed of oxide and glass, and the glass as at 10.

In the processing of metal in accordance with this invention, a disc such as 4, in Figure 3, is prepared in the following manner:

Flat copper stock is shaped to the desired form by drawing, punching, pressing, or other suitable forming process step. In this instance the flange 11, annular recess 12, and central opening 13 with opening defining cylindrical wall 14, are so formed.

After forming, the metal disc is thoroughly degreased, as for example, by immersion in carbon tetrachloride and then in boiling water. It is essential that a high degree of cleanliness be obtained at this point.

The next step is to provide an etched or otherwise slightly corrugated surface on the disc. Such a surface not only provides excellent holding means for the borax which is later coated thereon, but also facilitates the later oxidation of the metal. This surface is carefully formed by first applying 15% nitric acid for eight to fifteen minutes, followed by a thorough washing in water, a brief application, to the order of twelve seconds, of 50% nitric acid, and a second washing in water.

The nitric acid must be completely removed from the metal to avoid staining through the catalytic action of the acid when the disc is exposed to air. Further cleaning is carried out by soaking the disc in a 25% solution of ammonium carbonate for about a minute, and then rinsing the disc in distilled water.

The disc is then dried by bodily removing the liquid therefrom in a centrifuge operating at a rate of the order of 3600 R. P. M. Thus no liquid drys on the disc, and staining is avoided.

The disc is now perfectly etched, clean, and dry, and is ready for the application of a layer of borax. An important feature in this step is to form a porous layer of borax on the disc so that the metal may be readily oxidized even though covered with borax. There are several ways in which the disc may properly be coated with the borax. It might be sprayed on, or precipitated on from a surrounding atmosphere. One arrangement which works well is to brush the borax on to the disc.

In applying the borax, a solution is used, of the order of 25 grams of borax in 170 cc. of water, with 12 drops of "Triton" as a wetting agent. The solution is kept at about 90° C. "Triton" is the trade name of an organic poly-ether alcohol often used as a wetting agent.

The disc is mounted in rotation about its central axis as a vertical pivot, and the borax solution is applied with a brush by holding the brush at one point on the disc and rotating the disc. The borax precipitates out effectively as fast as it is brushed on, because the concentration of borax in the solution specified above as dissolved at 90° C. is greater than that which will remain dissolved at room temperature. When the operator sees a dull matte surface of borax on the disc, the operation is completed.

The disc is then heated to oxidize the metal under the borax. This is preferably done in a water cooled radio frequency furnace able to build up to high temperatures in a few seconds. The heating is a flash operation, leaving the disc with its surface oxidized for the joining with glass, and with a flux over the oxide in the form of a complex of borax and copper oxide.

In the instance of the assembly of the tube in the drawings, two discs so treated are located as separators of the glass sections 1, 2 and 3, and the whole is heated to form the seals and complete the formation of the tube envelope.

Glass seals so formed in accordance with this invention are very rugged and efficient, in marked contrast with seals heretofore obtained by other methods.

What I claim is:

1. In the method of preparing a copper disk for a glass to metal seal, the steps of: thoroughly cleaning said disk; etching said disk with nitric acid; cleaning in water and ammonium carbonate; drying in a centrifuge; precipitating on said disk a coating of dry borax; and thereafter placing said disk in a radio frequency field to flash heat the disk to oxidizing temperature for a few seconds only, to oxidize the metal without glazing the borax coating.

2. A method of preparing copper for a glass to metal seal, said method including the steps of precipitating onto the clean copper a coating of dry borax, thereafter placing the copper in a radio frequency field to flash heat said copper in a time of the order of a few seconds in order to oxidize the copper before the borax heats sufficiently to glaze.

HENRY J. McCARTHY.

REFERENCES CITED

The following references are of record in the file of this patent:

UNITED STATES PATENTS

| Number | Name | Date |
| --- | --- | --- |
| 1,271,320 | Housekeeper | July 2, 1918 |
| 1,816,881 | Warnke | Aug. 4, 1931 |
| 2,151,972 | Howlett | Mar. 28, 1939 |
| 1,946,766 | Shonkwiler | Feb. 13, 1934 |
| 1,065,704 | Mershon | June 24, 1913 |
| 1,268,647 | Keuren | June 4, 1918 |
| 1,498,908 | Fink | June 24, 1924 |
| 1,692,998 | Ruben | Nov. 27, 1928 |
| 2,092,636 | Brossman | Sept. 7, 1937 |
| 1,835,113 | Iridell | Dec. 8, 1931 |